United States Patent
Noureddin et al.

(10) Patent No.: US 8,724,471 B2
(45) Date of Patent: May 13, 2014

(54) METHODS AND SYSTEMS FOR SLIDING BUBBLE CONGESTION CONTROL

(75) Inventors: Sina K. Noureddin, Vancouver (CA); Avininder Pal Singh Grewal, Surrey (CA); Allison Courtney Lenters, Vancouver (CA)

(73) Assignee: Mobidia Technology, Inc. (CA)

( * ) Notice: Subject to any disclaimer, the term of this patent is extended or adjusted under 35 U.S.C. 154(b) by 98 days.

(21) Appl. No.: 13/411,336

(22) Filed: Mar. 2, 2012

(65) Prior Publication Data

US 2012/0236718 A1 Sep. 20, 2012

Related U.S. Application Data

(60) Provisional application No. 61/448,355, filed on Mar. 2, 2011.

(51) Int. Cl.
*H04L 12/26* (2006.01)
(52) U.S. Cl.
USPC ......................................... 370/235

(58) Field of Classification Search
USPC .......... 370/235, 230, 231, 232, 234, 236, 252
See application file for complete search history.

(56) References Cited

U.S. PATENT DOCUMENTS

| | | | |
|---|---|---|---|
| 6,438,104 B1* | 8/2002 | Fodor et al. | 370/230 |
| 2002/0141427 A1* | 10/2002 | McAlpine | 370/413 |
| 2002/0147011 A1* | 10/2002 | Kay | 455/427 |
| 2004/0170127 A1* | 9/2004 | Tanaka | 370/235 |
| 2006/0262738 A1* | 11/2006 | Fernandes et al. | 370/282 |
| 2009/0213811 A1* | 8/2009 | Wang et al. | 370/331 |
| 2010/0011270 A1* | 1/2010 | Yamamoto et al. | 714/748 |
| 2010/0020689 A1* | 1/2010 | Tang | 370/235 |

* cited by examiner

*Primary Examiner* — Mark Rinehart
*Assistant Examiner* — Ellen A Kirillova
(74) *Attorney, Agent, or Firm* — Dergosits & Noah LLP; Todd A. Noah

(57) ABSTRACT

A transmission method for multiple TCP sessions with the same host including methods for congestion control and retransmission of lost segments.

13 Claims, 14 Drawing Sheets

METHODS AND SYSTEMS FOR SLIDING BUBBLE CONGESTION CONTROL

CLAIM OF PRIORITY

This application claims the benefit of U.S. Provisional Patent App. No. 61/448,355 entitled SLIDING BUBBLE CONGESTION CONTROL, by Sina K. Noureddin et al., filed Mar. 2, 2011, the entire contents of which are incorporated herein by reference.

TECHNICAL FIELD

This disclosure relates generally to the field of packet-based networks, and more specifically, to systems and methods for congestion control in such networks.

BACKGROUND

A significant number of packet protocols have been developed and optimized specifically for wired networks. For example, the congestion control used in the Transmission Control Protocol (TCP) has been adapted over time to achieve maximum throughput in fixed bandwidth networks, and to work in a "fair" manner even during heavy network congestion. However, with the move to packet-based networks over a wireless infrastructure, these congestion mechanisms are not always well-suited to the different characteristics found in such a wireless domain, such as:

1. A Longer Latency/Round Trip Time.

The lower bandwidth of the wireless network introduces a considerable amount of latency for a packet. The longer latency is also caused by the nature of the shared network, in which each session waits for the appropriate scheduling to enter the network.

2. Variable Bandwidth.

The bandwidth available to a given mobile or wireless device is a function of many factors. For example, as the user moves, the distance to the antennae moves, which may result in obstructions. Even if the user is stationary there are factors that can impact bandwidth, including vehicles moving between the user and the antennae, other users on the network entering and leaving the shared medium, proximity to other networks, and the associated power/bandwidth management of the radio frequency (RF) signals.

The longer latency and longer round trip time ("RTT") impacts TCP's ability to quickly ascertain the available bandwidth in a static bandwidth environment. In an environment with a high variable bandwidth, the problem is exacerbated for TCP to efficiently track the available bandwidth.

Variable bandwidth can also indirectly lead to packet drop, which is a significant concern for a wireless network operator. In a situation in which two or more TCP sessions are made aware of available bandwidth in the wireless network, they will increase their data flow speed. This can result in an overloading of the buffers inside the network. Consequently, packets can be dropped off of the tail of the buffer. When there is an excess of packets and some are dropped, retransmission occurs, consuming resources that would otherwise be used to transport new packets.

Further, there are often multiple, simultaneous TCP sessions from multiple sources all destined for a single endpoint. An example would be a user surfing the Internet (which contains multiple sessions in itself) on a mobile device, while downloading an email. With multiple sessions, all independent of each other, the difficulty in ascertaining the available bandwidth across all the sessions is increased. This traffic can be characterized as "bursty" since in the aggregate of all sessions, the instantaneous bandwidth can far exceed or be well below the overall capacity of the wireless network.

The TCP protocol is ubiquitous and has to serve all types of network topologies, including wireless. It is thus highly desirable that any improvements in efficiency must be invisible and applicable to the existing servers that are the source of the TCP sessions, and the clients that are the recipients of the TCP sessions. It is also a requirement that any improvement have no effect on other network traffic and that full Quality of Service (QoS) be maintained.

The goal of increasing the efficiency of wireless networks can be solved by increasing the efficiency of methods for recovery of lost segments in a stream-oriented transport layer protocol, as well as the application of congestion control to multiple sessions between a pair of hosts.

The two fundamental state variables underlying all TCP congestion control techniques are commonly known as the congestion window (cwnd) and the slow-start threshold (ssthresh), which were first described in the article by Jacobson et al. entitled "Congestion Avoidance and Control" (Proceedings of SIGCOMM '88) (1988). In short, the notion of a sliding congestion window limits the amount of data that the sender will transmit, measured from the highest contiguously acknowledged sequence number for a given session (representing the left edge of the sender's window). Whenever cwnd<ssthresh, the sender grows cwnd exponentially upon receiving each acknowledgement that advances the left edge of the window. Beyond ssthresh, the sender enters congestion avoidance, and grows its window according to one of several growth functions, the most basic of which is a linear increase. The modulation of these two variables is at the heart of virtually all TCP congestion control techniques.

In general, every TCP flow makes independent RTT measurements, and maintains its own congestion window and retransmission timer. With the introduction of aggregated session management ("ASM"), however, the one-dimensional congestion window is inadequate.

BRIEF SUMMARY

This disclosure describes extending the congestion window into two dimensions, where the added dimension represents the plurality of sessions. We refer to this structure as the congestion "bubble." Furthermore, the fact that a group of sessions are destined for a single physical host is leveraged by maintaining a single retransmission timer for all sessions, which is updated by an acknowledgement from any one of those sessions.

In general, the present disclosure describes systems and methods for controlling data transmission events for multiple TCP sessions with the same host. In one embodiment, a congestion bubble having a two-dimensional buffer volume rather than a single-dimensional linear buffer area is provided, and different portions of the congestion bubble are allocated to different sessions during a transmission event for multiple sessions.

A transmit scheduler establishes how much data may be sent by a host, as well as how much bandwidth to allocate that data. For example, in one embodiment, the amount of data to be sent equals the current size of the congestion bubble less the current flight-size estimate when a current size of the congestion bubble is less than a current flight-size estimate. In another embodiment, the amount of data to be sent equals the smallest of the current size of the congestion bubble and the amount of dropped data when a current size of the congestion bubble is not less than a current flight-size estimate and the dropped data is less than zero.

In another embodiment, the transmit scheduler sets a transmit bandwidth equal to the largest of the current size of the congestion bubble and the slow start threshold divided by the minimum round trip time. In another embodiment, the transmit scheduler sets a transmit bandwidth equal to the largest of the current size of the congestion bubble and the slow start threshold divided by the minimum round trip time.

DETAILED DESCRIPTION

U.S. patent application Ser. No. 12/472,863, entitled Aggregated Session Management Method and System, and incorporated by reference herein, describes an aggregated session management ("ASM") system. U.S. patent application Ser. No. 13/039,231, entitled Method and System for Retransmission in ASM, and incorporated by reference herein, describes a method for retransmitting lost packets in an ASM system.

1. Operating Environment

Figure 1:
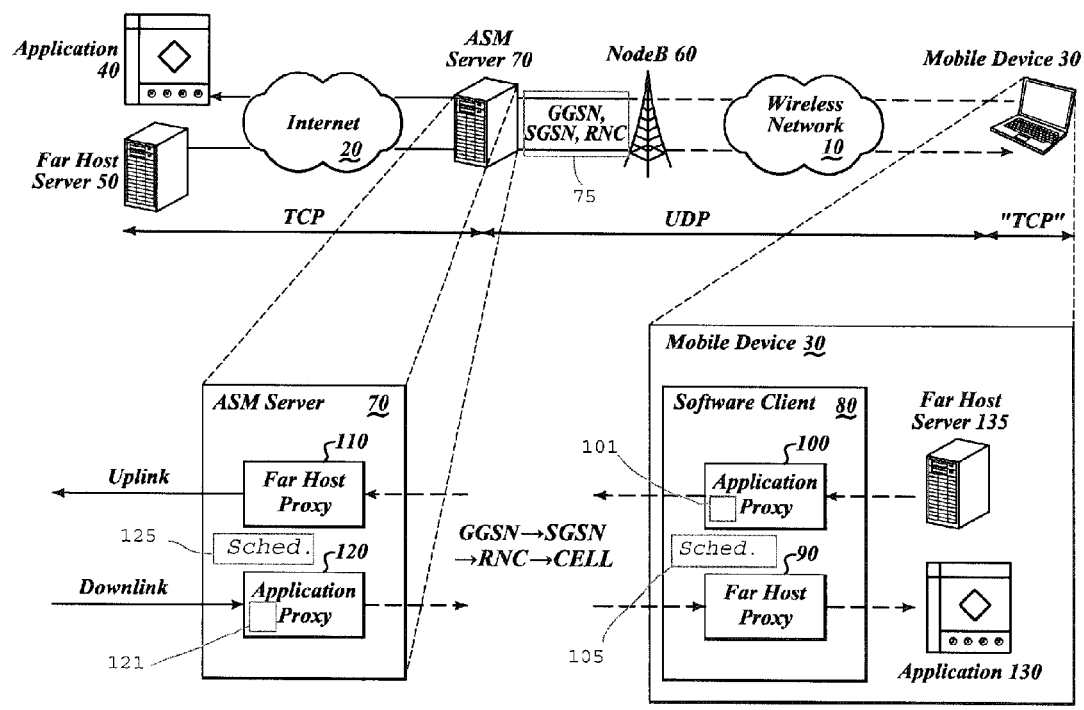
FIG. 1 is a block diagram illustrating the architecture and data flow of an Aggregated Session Management (ASM) system.

FIG. 1 shows the wireless connection route between mobile device 30 and the use of application 40 through the Internet 20 with the benefit of ASM proxy server 70. The mobile device 30 connects to wireless network 10, which is linked to a node B antenna 60 in the vicinity of the mobile device. The node B antenna 60 is controlled by a radio interface 75, such as Gateway General Serving Support Node ("GGSN"), Serving GPRS Support Node ("SGSN"), or Radio Network Controller ("RNC"). An ASM proxy server 70 monitors the radio interface 75 on behalf of mobile devices such as device 30 and accesses application 40 through the Internet 20. In a typical embodiment, the protocol used for packets transmitted between ASM proxy server 70 and mobile device 30 is the Uniform Datagram Protocol ("UDP") while TCP is used for packets transmitted between ASM proxy server 70 and far host server 50. One of ordinary skill in the art will appreciate that even though ASM proxy server 70 is shown as a single server computer, it may in fact comprise one or several computers, with conventional components, including input and output means, a processor, and a memory. The elements shown in FIG. 1 are illustrative only and not intended to limit this disclosure.

In the embodiment of FIG. 1, ASM server 70 is located at the point of initial traffic entry from the Internet 20 to the mobile network 75. In a UMTS or GSM based network, this is at the Gi interface of GGSN. Mobile device 30 includes software client 80, which includes far host proxy 90 and application proxy 100, as well as scheduler 105. A congestion control module 101 is also part of the application proxy 100. ASM Server 70 likewise includes its own far host proxy 110, application proxy 120 with congestion control module 121, and scheduler module 125.

In a typical embodiment, application proxies 100 and 120 both provide the function of terminating TCP flows, extracting the payload from the TCP flows, and encapsulating the payload into a UDP packet. Likewise, far host proxies 90 and 110 both provide the function of receiving a UDP packet, extracting the payload, and presenting the payload to the application 40 as a TCP packet.

Application proxy 120 within proxy server 70 may terminate TCP flows from far-host server 50 within the Internet 20. Within software client 80 on mobile device 30, application proxy 100 may terminate TCP flows from the application 130 running on mobile device 30. Mobile device 30 may act as far host server 135 in messages sent to application 40.

In an embodiment, far host proxy 110 within ASM server 70 may reverse the effects of application proxy 120 by converting packets to TCP. Within software client 80, however, the TCP packet may not be created, but the payload may be presented to application 130 as though it came from a TCP socket of the operating system operating on mobile device 30.

ASM server 70 may use application proxy 120 for downstream data flow (i.e. to mobile device 30) and may use far host proxy 110 for upstream data flow (i.e. to far host server 50). Software client 80 on mobile device 30 may use application proxy 100 for upstream data flow and far host proxy 90 for downstream data flow. Combined, the four proxies, 90, 100, 110 and 120 are referred to herein as the Dynamic Multimedia Proxy ("DMP"). In this fashion, the DMP allows for flow control specifically designed for wireless networks, while "hiding" the behavior of the wireless network from the original TCP far host and TCP client flow control mechanisms.

Figure 2:
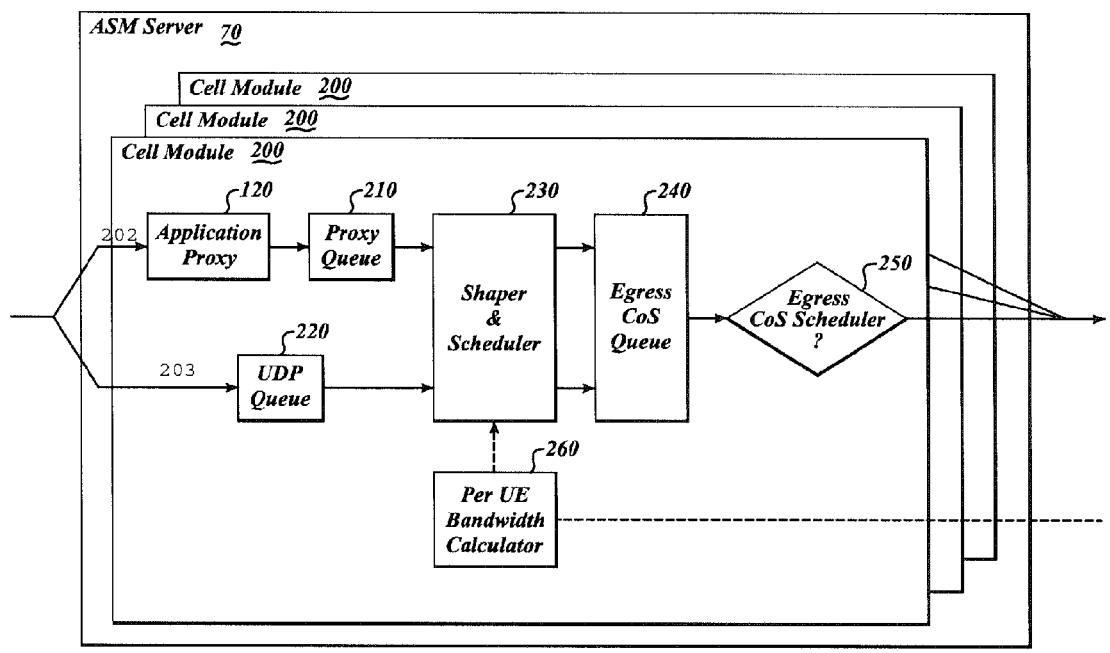
FIG. 2 is a block diagram showing the components of a cell module.

Application proxy 120 on ASM server 70 has several additional components to provide efficient packet flow. Since there are typically multiple cells operating within wireless network 10, each cell manages its own data flow. Therefore, within ASM server 70, multiple cell modules 200 are present, as shown in FIG. 2. Each cell within wireless network 10 is assigned a unique cell module 200 for monitoring traffic.

In one embodiment, each cell module 200 includes the following components:

Application Proxy 120: Application proxy 120 appears to far host server 50 as an application. Application proxy 120 terminates the TCP protocol, and provides far host server 120 the required handshakes.

Proxy Queue 210: Proxy queue 210 stores the payloads for a particular TCP session. The output of proxy queue 210 is a TCP payload encapsulated in a UDP packet.

UDP Queue 220: UDP queue 220 stores the UDP sessions.

Shaper and Scheduler 230: Shaper and scheduler 230 schedules for transmission the UDP payloads stored in both proxy queue 210 and UDP queue 220 and enqueues the packets to egress Class of Service (CoS) queue 240. Furthermore, shaper and scheduler 230 provides both appropriate fairness for the subscribers to a cell, and appropriate fairness for all active sessions on a client.

Egress CoS Queue 240: Each cell in wireless network 10, and each cell module 200 has one or more egress CoS queues 240. All outgoing packets for cell module 200 are placed in egress CoS queue 240.

Egress CoS Scheduler 250: Egress CoS scheduler 250 uses a method based on typical QoS requirements to select the next packet to be transmitted from the CoS Queue 240.

Per Mobile Device Bandwidth Calculator 260: Per mobile device bandwidth calculator 260 calculates an optimal bandwidth based on both the bandwidth available on wireless network 10 and the bandwidth available to mobile device 30.

Each module described above may be implemented in hardware or software within ASM server 70 using well known methods.

As seen in FIG. 2, two streams of packets flow through cell module 200, a first stream 202 handling incoming TCP packets, and a second stream 203 handling incoming UDP packets.

Scheduler and shaper 230 therefore performs two functions. The first function is scheduling the delivery of packets into egress CoS queue 240 by fairly selecting a mobile device 30 and then fairly selecting a packet from one of that particular user's session queues. In addition to scheduling, scheduler and shaper 230 shapes the flow of data by using the incoming bandwidth information provided by per mobile device bandwidth calculator 260 about the aggregate bandwidth of all streams terminating at the particular mobile device 30, to determine the optimal flow speed of the mobile device.

Another function performed by ASM server 70 is to number the outgoing packets. Thus, when receiving a report from a receiver, as described below, ASM server 70 will be able to determine which packets were not received. If the last packet sent was not received, the report will not include an acknowledgement of that packet, so that ASM server 70 will be able to determine if that packet was not received.

1.1 ASM and Acknowledgement

To significantly decrease the number of Acknowledgement (ACK) packets transmitted through wireless network 10, the receiver (i.e. the mobile device 30, far host server 50, or ASM server 70 receiving the packets, as appropriate) may send, for example, in response to a report-request by the sender, or in response to a received data packet, a single reply containing a consolidated report of all of the current sessions with the sender. The sender dispatches report-requests at a pre-determined frequency t that both minimizes the time it takes for retransmission of any arbitrary lost packet, and minimizes the amount of traffic on wireless network 10. To provoke the receiver to send such a report, the sender sends a report-request to the receiver with a timestamp. The receiver replies with a report containing the timestamp in the report-request as well as a report of all the data packets that have been received across all sessions since the last transmitted report.

If there is no more data to either send or retransmit, and all sent data has been acknowledged, then following an acknowledgement of the last packet sent, the sender may cease sending report-requests.

The report includes the last packet received from the sender, so that if last packet sent is not the expected packet (e.g., packet number 9 of 10 is acknowledged, but not packet 10), then the sender knows packet 10 was not received.

Figure 3:
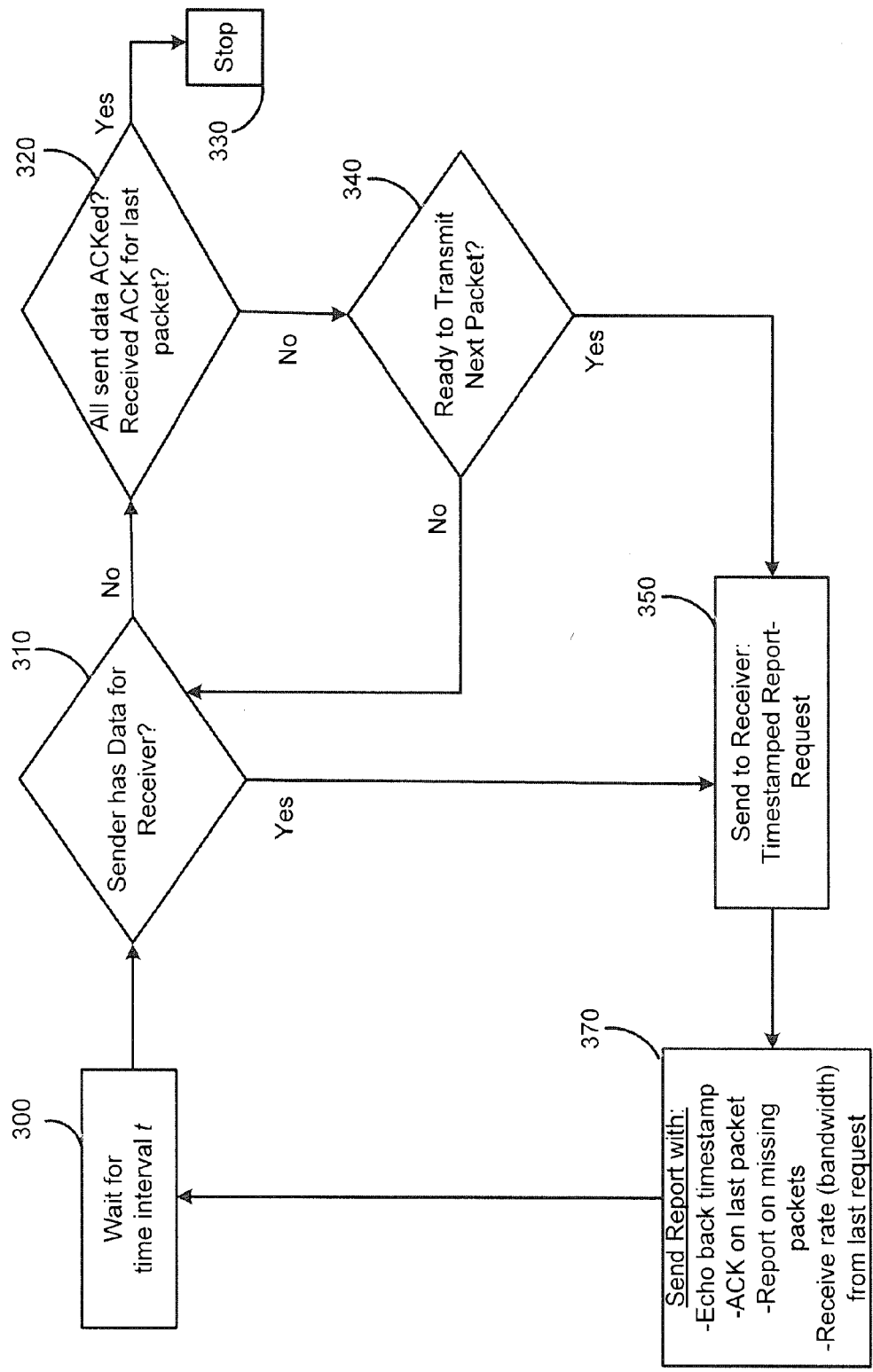
FIG. 3 is a flow diagram showing the process for acknowledging receipt of packets.

FIG. 3 illustrates a method by which a request and report-request are transmitted. In step 300, the system waits until time t has passed. Then, the sender determines if it has new packets to send to the receiver (step 310). If there is no data for the receiver, the system then checks to see if all sent data has been acknowledged and an ACK has been received for the last packet sent to receiver (step 320). If so, the process ends (step 330). If not, the sender waits until the retransmission logic allows for the next data packet to be retransmitted (step 340), at which point the report-request is included in the data packet and the data packer and report-request are sent to the receiver in step 350.

On receiving the report-request, the receiver sends a report to the sender, including an ACK for the last packet received, the time stamp of the report-request, a report of missing packets and the rate of receipt of packets (step 370).

Figure 4:
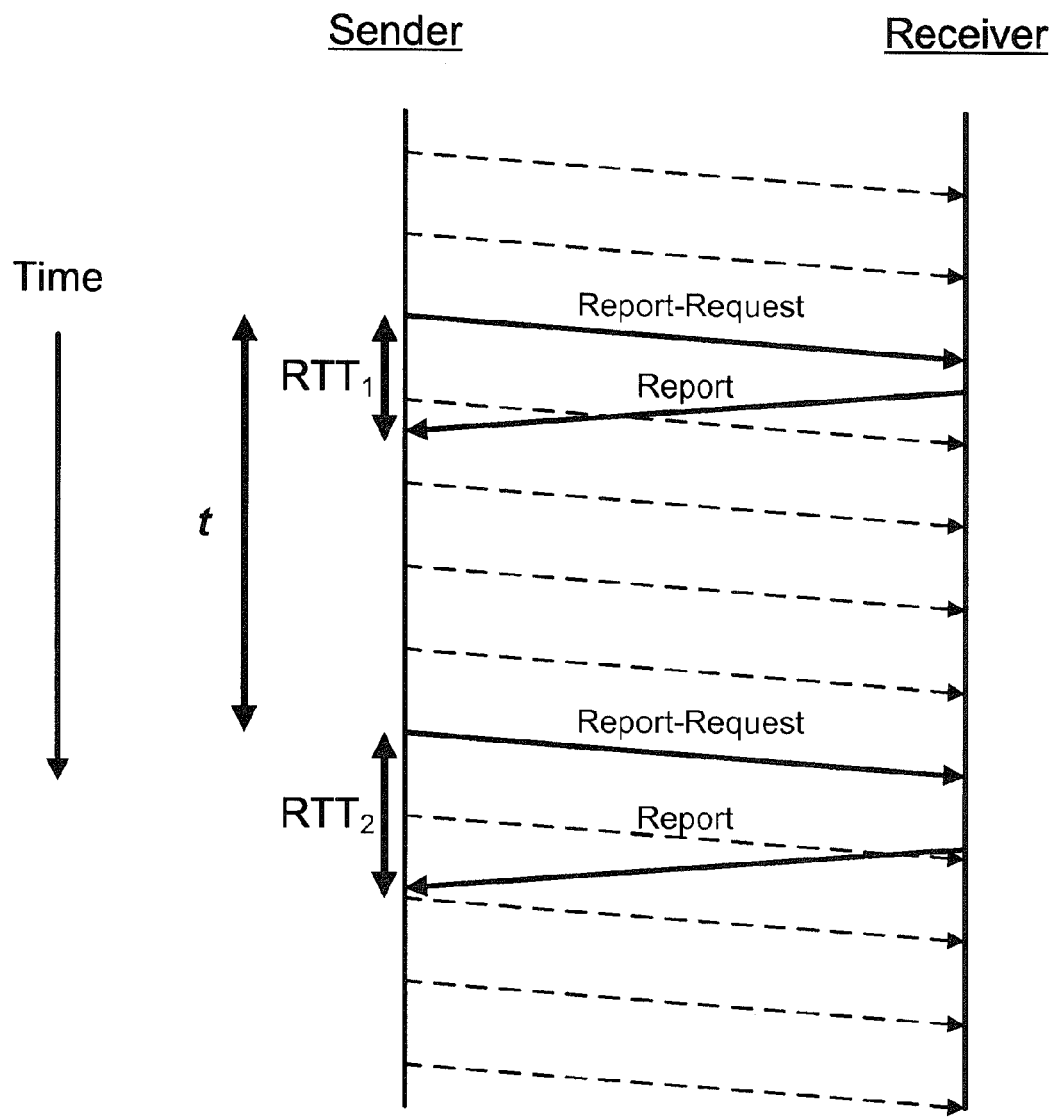
FIG. 4 is a timing diagram of the process shown in FIG. 3.

FIG. 4 provides the reader with a timing diagram of the report-request process. RTT (Round Trip Time) represents the time taken between the sending of a report-request and the receipt of the report.

1.2 Example

An example includes a mobile device 30, such as a 3G Smartphone (acting as the receiver) browsing the Internet 20 with multiple windows open, thus creating multiple sessions. The packets provided to mobile device 30 pass through a gateway, such as a Network Access Translator (NAT), that authorizes connection to the Internet 20. As the packets travel through the gateway, without loss of generality, it assumes the role of the sender and acts as ASM server 70.

Figure 5:
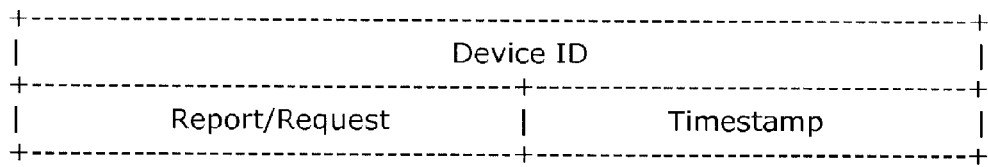
FIG. 5 is an example of a time-stamped report-request.

The gateway tracks the sent data packets from each of the established sessions of mobile device 30. To determine the success of each transferred packet, the gateway sends time-stamped report-request packet, as seen in FIG. 5, to mobile device 30 at a predetermined time interval t.

Figure 6:
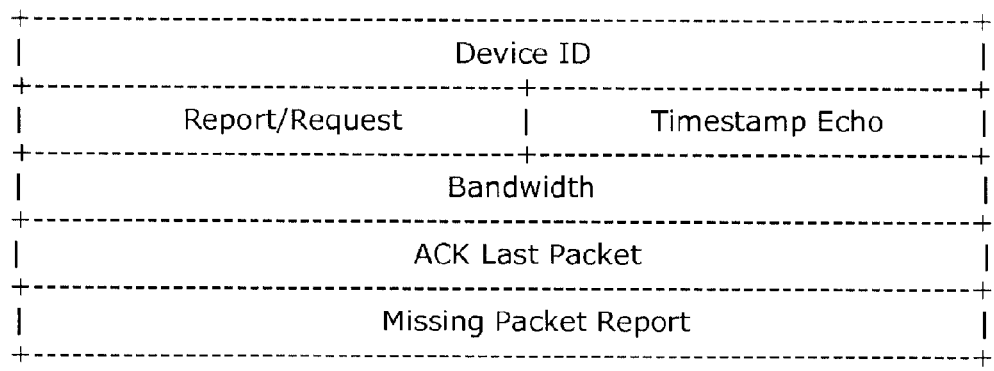
FIG. 6 is an example of a time-stamped report.

On receipt of the report-request, mobile phone 30 lists the packets that have not been received and sends a report, as seen in FIG. 6, to the sender. The sender enumerates all the incoming packets so the receiver easily discerns which packets were not received.

The Report/Request field within both the report-request and the report packets is a one-bit field that indicates whether the message is a request (1) or a response (0).

Once the user of mobile device 30 has finished browsing the Internet, the sessions associated with mobile device 30 become dormant. Once the sender has received an ACK for the last packet sent, all sessions are concluded and the report-request process is likewise terminated.

The transmission of report-request packets is time based so that if no report is received in the time interval t, due to either a lost report-request or a lost report, the sender transmits another report-request following the expiration of t as per usual.

2. Retransmission

In an ASM network, all data packets intended for the mobile device 30 are treated as one collective stream, and not as individual sessions. This suggests that the report-request scheme described above would provide for an efficient method of retransmission in an ASM network.

In one embodiment, retransmission of lost packets takes precedence over transmission of new data. The timestamp method described above is used to calculate an accurate RTT in order to avoid premature retransmissions.

The calculation of RTT and RTO will now be described.

The calculation of RTT is a continuous process that relies on the previously calculated RTT. In one embodiment, a Smooth RTT (SRTT) is employed recursively, as follows:

$$SRTT(i) = (1-\alpha) \times SRTT(i-1) + RTT(i)$$

where α=⅛ as a smoothing factor; RTT(i) is the ith timestamp calculated RTT; SRTT(i−1) is the (i−1)th calculated SRTT; and SRTT(1) is assigned the value RTT(1) as the base for the recursion.

The calculation of RTO relies upon the calculation of SRTT, as follows:

$$RTO(i) = \beta \times SRTT(i)$$

where β=2 (recommended value); and SRTT(i) is the ith calculated SRTT.

3. Sliding Bubble Congestion Control

When dealing with multiple sessions destined for the same host, each of which has independent flow control and potentially different data throughput, the task of applying congestion control to all sessions is not trivial. If a single congestion window size is applied to all sessions, regardless of whether the smallest, largest or mean window size is chosen, problems can arise. For this reason, the concept of a bubble to handle congestion is appropriate. Not only does the shape of the bubble capture the extra dimension of sophistication required for ASM, but its inherent flexibility allows it to easily handle different flows from different sessions that have unequal throughput.

3.1 Flight Size vs. Congestion Window

A congestion window represents an envelope of sequence numbers within which a TCP sender can transmit segments. The concept of flight-size represents the estimated number of outstanding octets that have been transmitted but not yet acknowledged. So long as the sender is not application or receiver-limited, and has not received any dubious acknowledgements, these two values should be more or less identical. However, whenever the sender detects a lost segment, these two values can diverge, and maintaining an accurate estimate of the flight-size is a critical element of loss recovery and congestion avoidance.

Figure 7:
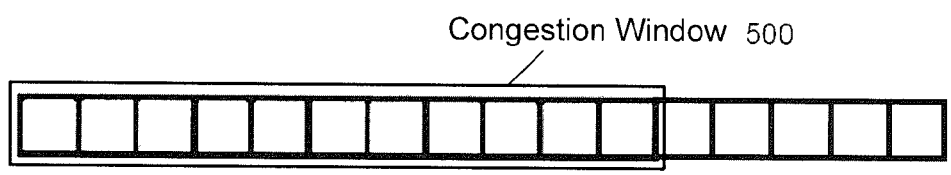
FIG. 7 is an example of a congestion window.
Figure 8:
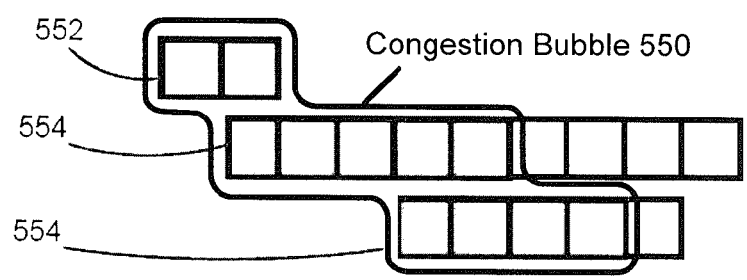
FIG. 8 is an example of a congestion bubble.

Rather than trying to enforce transmission limits based on sequence number offsets, which really only has validity within the context of a single session, the congestion bubble still aims to maintain a target flight-size (represented by the area within the bubble), but does so without regard to which sessions actually end up filling the bubble. For example, FIG. 7 shows a conventional linear congestion window 500 having a flight-size of 11 octets, which is well-suited to handle congestion for single sessions. In contrast, FIG. 8 shows a two-dimensional congestion bubble 550, also having a flight-size of 11 octets, but more flexible in accommodating the variations of data flow resulting from multiple sessions. For example, a first session may be allocated the two octets 552 in the top row of the bubble 550; a second session may be allocated the five octets 554 in the middle row of the bubble; and a third session may be allocated the four octets 554 in the bottom row of the bubble.

One example to illustrate the flexible behavior of the congestion bubble is the case where flow control for one session forces it to consume data much more slowly than that of another session. As a result, the shape of the bubble could be extended to allow the faster session to utilize a greater relative share of the bubble area.

3.2 Transmit Scheduler

In order to realize ASM, all of the sessions are decoupled from the congestion control module by way of a transmit scheduler. For example, FIG. 1 shows a scheduler module 105 in the software client 80 as well as a scheduler module 125 in the ASM server 70. The transmit scheduler provides two critical functions. First, it serves as a policy enforcement point for determining when a session is allowed to transmit. Second, it shapes the transmit bandwidth according to the rate determined by the ASM-aware congestion control methods implemented in the congestion control modules 101 and 121.

Figure 9:
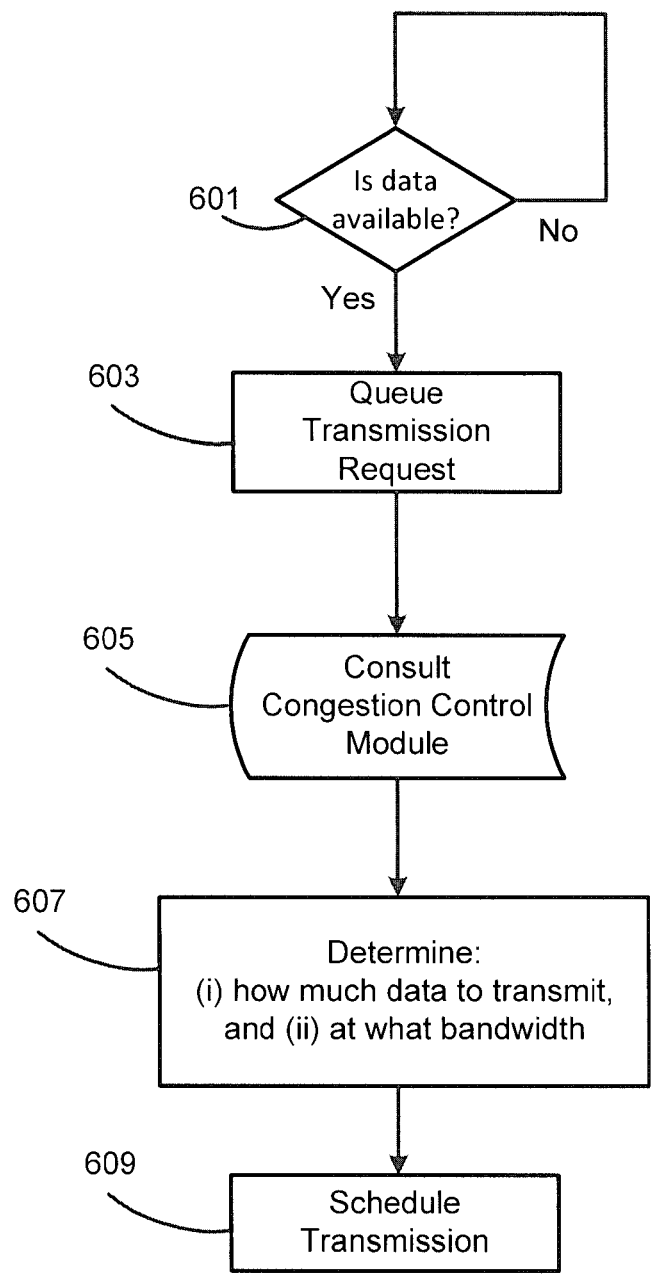
FIGS. 9 and 10 are flow diagrams showing processes for the retransmit scheduler.

As shown in FIG. 9, whenever application data becomes available for transmission (step 601), a request is queued to the transmit scheduler (step 603). So long as there is pending data to be delivered, the transmit scheduler will then consult the congestion control method of the congestion control module (step 605) in order to determine how much data can be delivered for a given host, and at what bandwidth it should be transmitted (step 607). Finally, the transmission is scheduled (step 609). In this manner, the methods of the congestion control module are agnostic to the number of sessions that are active, as well as to any class-of-service differentiation or throughput variation that might exist between the sessions. The only goal is to try to ensure that the target flight-size is maintained.

3.3 Flight-Size Estimation

Figure 10:
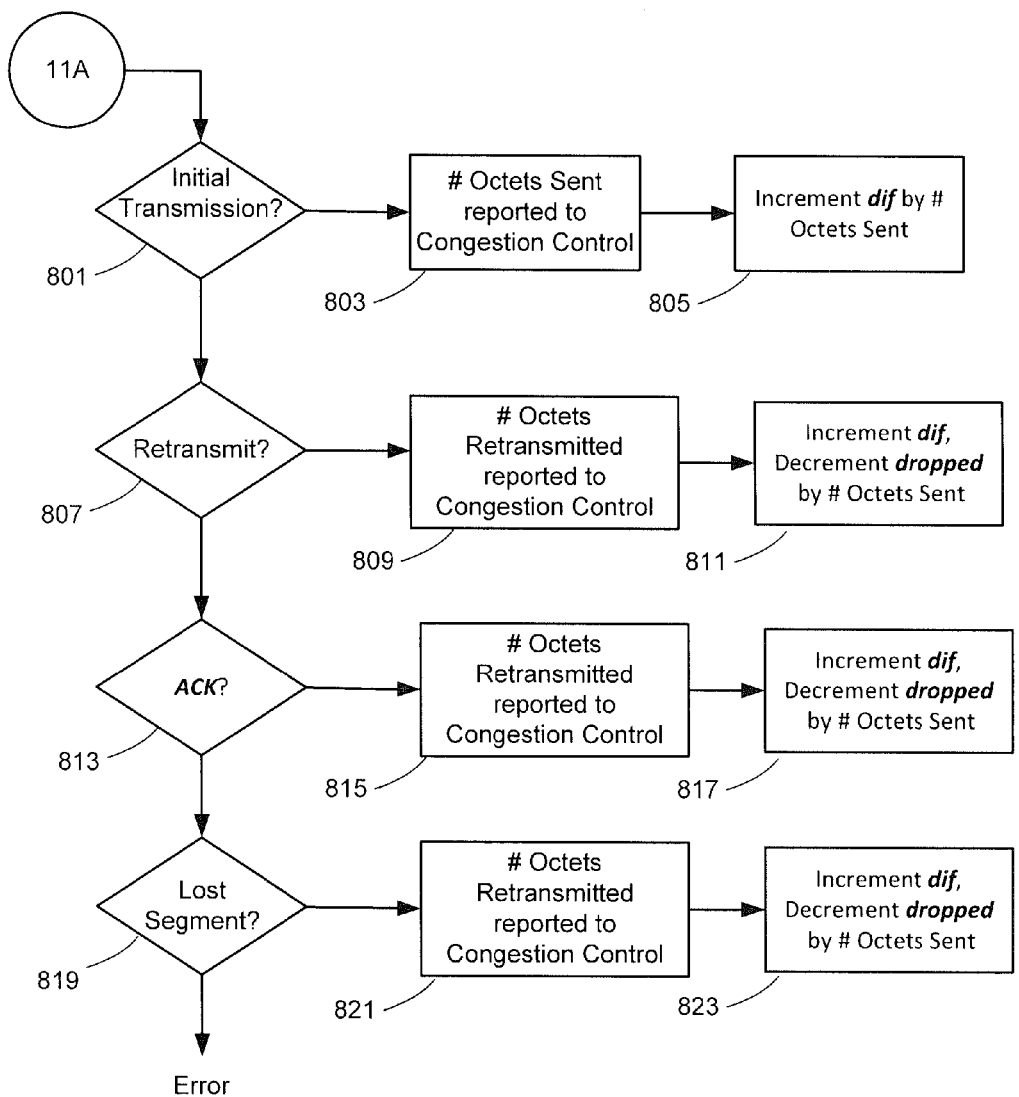

There are four events, described further below with reference to FIG. 10, of which the ASM-aware congestion control methods must be informed in order to maintain the flight-size estimate: (i) data sent (initial transmission); (ii) data retransmitted; (iii) data acknowledged; and (iv) data deemed to be dropped in the network.

There are also six state variables that the congestion control method must monitor and maintain for proper operation, all of which are measured in octets: (i) dif (the current flight-size estimate); (ii) cbub (the current congestion bubble size); (iii) dropped (the number of octets that are deemed to be dropped but have not yet been retransmitted); (iv) unsent (the number of octets received from the application layer that have never been transmitted, and will fit within the receiver's advertised windows); (v) ssthresh (the slow-start threshold; analogous to TCP); and (vi) cbub_acked (a state variable that is incremented by the number of octets that have been positively acknowledged; it is used to mark the end of a recovery epoch, and can also be used to apply a linear growth function to the congestion bubble).

After a data transmission event is scheduled by the transmit schedule in step 609, it must be determined which of the four types of events is taking place. In step 801, if suitable program logic determines that an initial transmission of data is taking place (Data Sent), then the congestion control method is informed of the number of octets being sent in step 803. Whenever this happens, dif must be incremented by the specified amount as in step 805.

If the transmission event is not an initial transmission in step 801, then the program logic considers whether the even represents retransmitted segments (Data Retransmitted) in step 807. If so, then the congestion control method is informed in step 809, and dif must still be incremented, but dropped must also be decremented by the specified number of octets (step 811).

Whenever data is positively acknowledged in step 813 (Data Acknowledged), the method must again be informed of the number of octets that have been acknowledged (step 815). At this point, dif is decremented by the specified amount. This can also potentially trigger an increase in the size of cbub and/or cbub_acked, depending on the current congestion state (slow-start, congestion avoidance, or loss recovery), as further discussed below.

Finally, whenever the retransmission logic determines that a segment has been lost in step 819 (Data Dropped), either due to the arrival of duplicate acknowledgements or the expiration of the retransmission timer, the method of the congestion control module is notified in step 821, and in step 823, dif is decremented and dropped is incremented.

It is important to note here that because the state machine of the congestion control method is decoupled from the transmit scheduler, there is a potential corner case that can arise where a segment is positively acknowledged after it has been (incorrectly) marked as dropped, but before the transmit scheduler actually retransmits the segment. In such a case, it is imperative that event 2 (data retransmitted) be artificially triggered before event 3 (data acknowledged) in order to correctly maintain the value of the dropped variable, even though the segment is never actually retransmitted.

As the accuracy of flight-size estimation has a significant impact on the speed and efficiency of loss recovery, DMP is the transport layer protocol of choice, as timestamps and selective acknowledgements are not optional. Furthermore, DMP's selective acknowledgements are more reliable and efficient than TCP's, because the DMP receiver is not allowed to renege a SACK'ed segment, and it also has the ability to acknowledge multiple sessions within a single packet.

4. Congestion Bubble Maintenance

Figure 11:
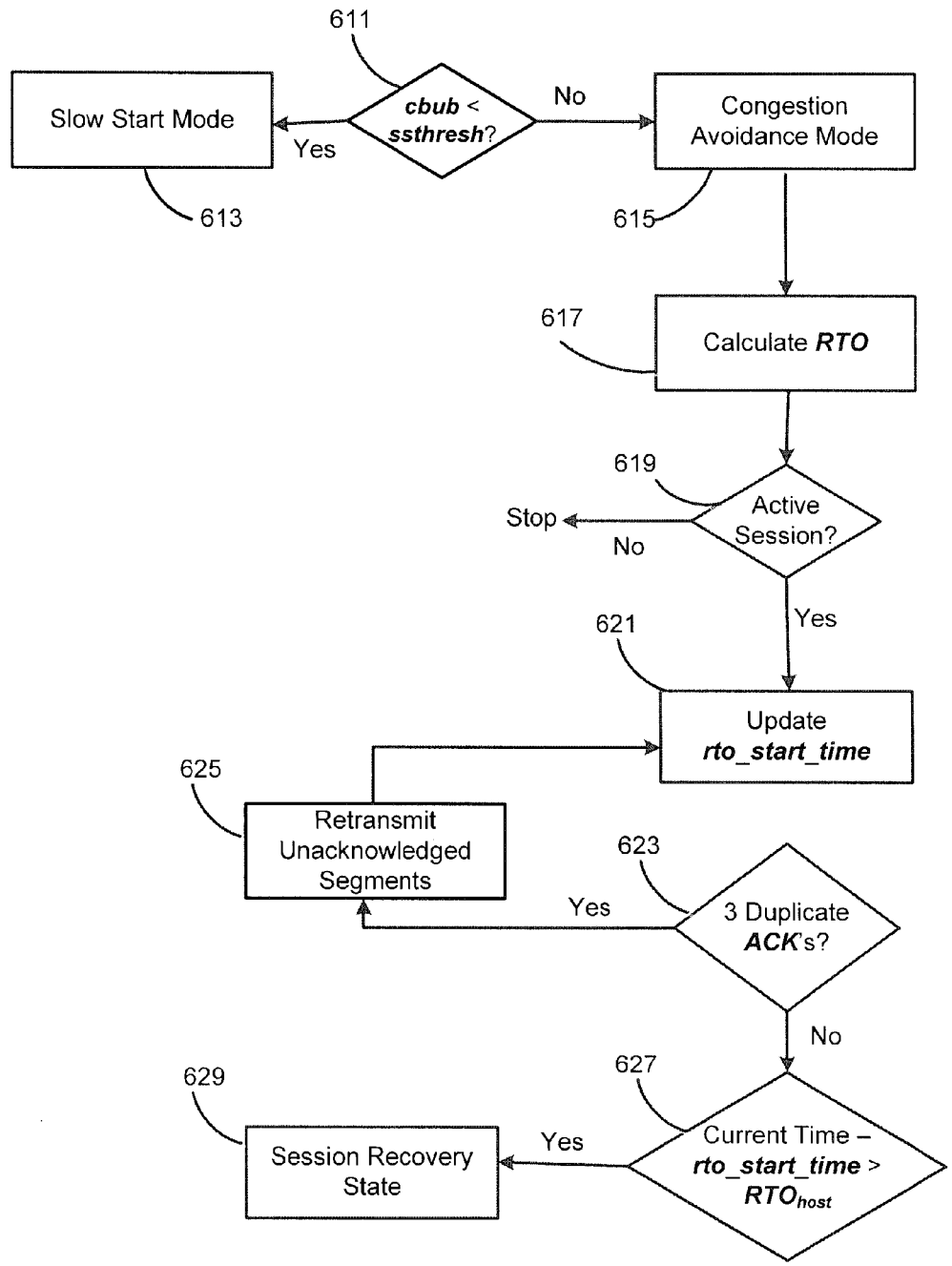
FIG. 11 is a flow diagram showing a process for a congestion control method.

Several aspects of the maintenance of the congestion bubble are analogous to the TCP congestion window. For example, as shown in FIG. 11, provided that there are no dubious acknowledgements or retransmission timeouts, whenever cbub<ssthresh (step 611), the sender is in slow-start mode (step 613). Otherwise, the sender is in congestion avoidance mode otherwise (step 615). However, the most important difference between conventional congestion control and ASM-aware congestion control is in the reaction to and recovery of lost segments. Although ASM-aware congestion control still maintains the ability to retransmit a segment either due to a retransmission timeout or to the arrival of duplicate acknowledgements, it distinguishes between a session RTO (which occurs when fewer than all active sessions have timed out) and a host RTO (which occurs when all sessions have timed out).

4.1 Session RTO, Host RTO and Fast Retransmit

One of the primary characteristics of ASM-aware congestion control is that a single retransmission timer value is maintained per host, which applies to (and is modulated by) all of the active sessions to that host. An active session is defined as one that has unacknowledged segments in its retransmission buffer. As to the derivation of the value itself, RTO must be calculated (step 617), for example, according to the method described in the article by Paxson et al. entitled "Computing TCP's Retransmission Timer" (RFC 2988, Internet Engineering Task Force, 2000), using acknowledgements to segments from all sessions.

Although there is only one timer value, each session must still maintain its own virtual retransmission timer. This can be achieved by storing an rto_start_time state variable. Upon transitioning to the active state (step 619), or whenever the left edge of a session advances due to a positive acknowledgement, rto_start_time must be updated to the current time (step 621). Similarly, if three duplicate acknowledgements, as defined in the article by Allman et al. entitled "TCP Congestion Control" (RFC 5681, Internet Engineering Task Force, 2009), arrive for that session (step 623), it must retransmit the unacknowledged segment (provided that the segment has never before been retransmitted) (step 625) and once again update its rto_start_time variable (step 621) (this is analogous to TCP's fast retransmit). If DMP is used as the transport layer protocol, then three negative acknowledgements for any segment within the stream can be used to trigger a fast retransmit. However, rto_start_time should only be updated when the leftmost segment is retransmitted.

If at any point, the difference between the current time and rto_start_time for a session exceeds the RTO value for the host (step 627), then that session has timed out and enters the session recovery state (step 629).

Figure 12:
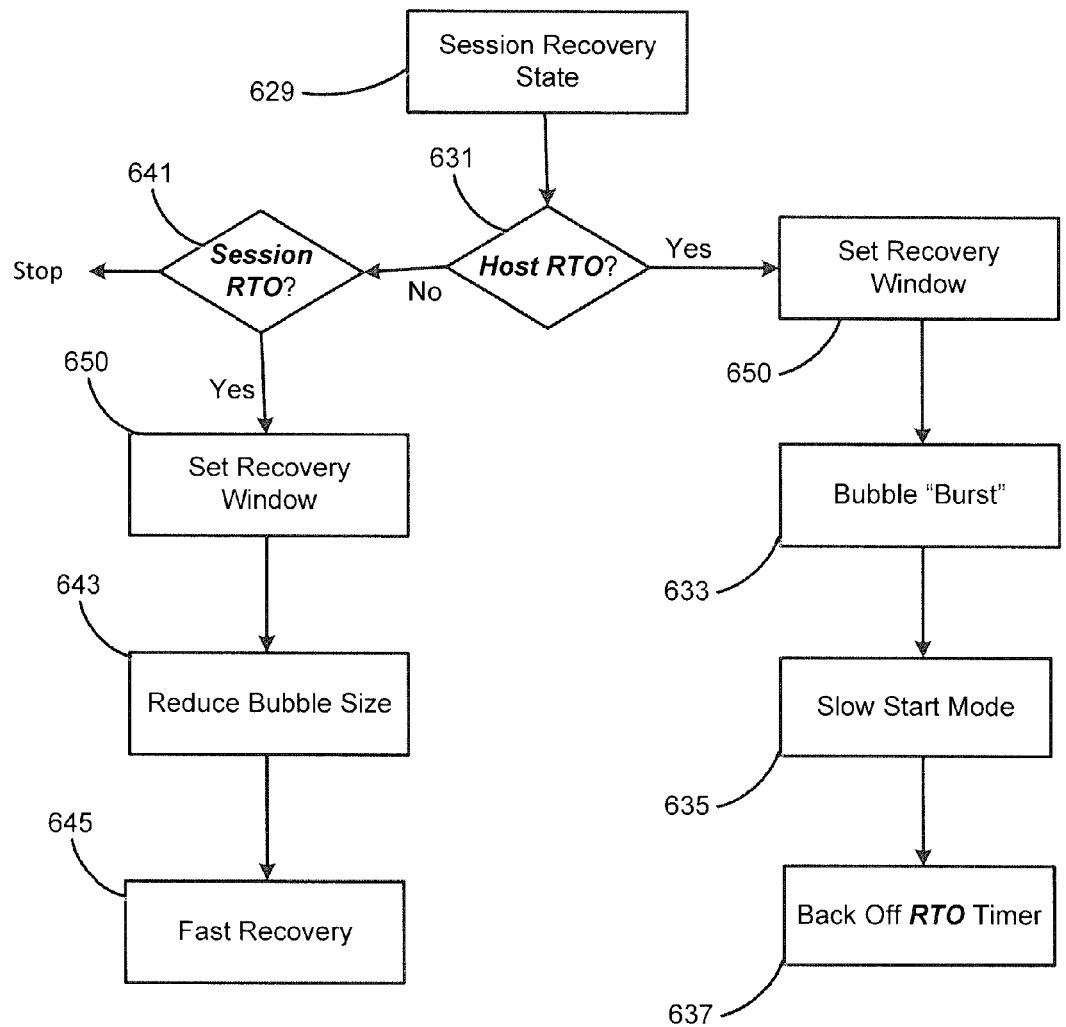
FIG. 12 is a flow diagram showing a process for a congestion control method.
Figure 14:
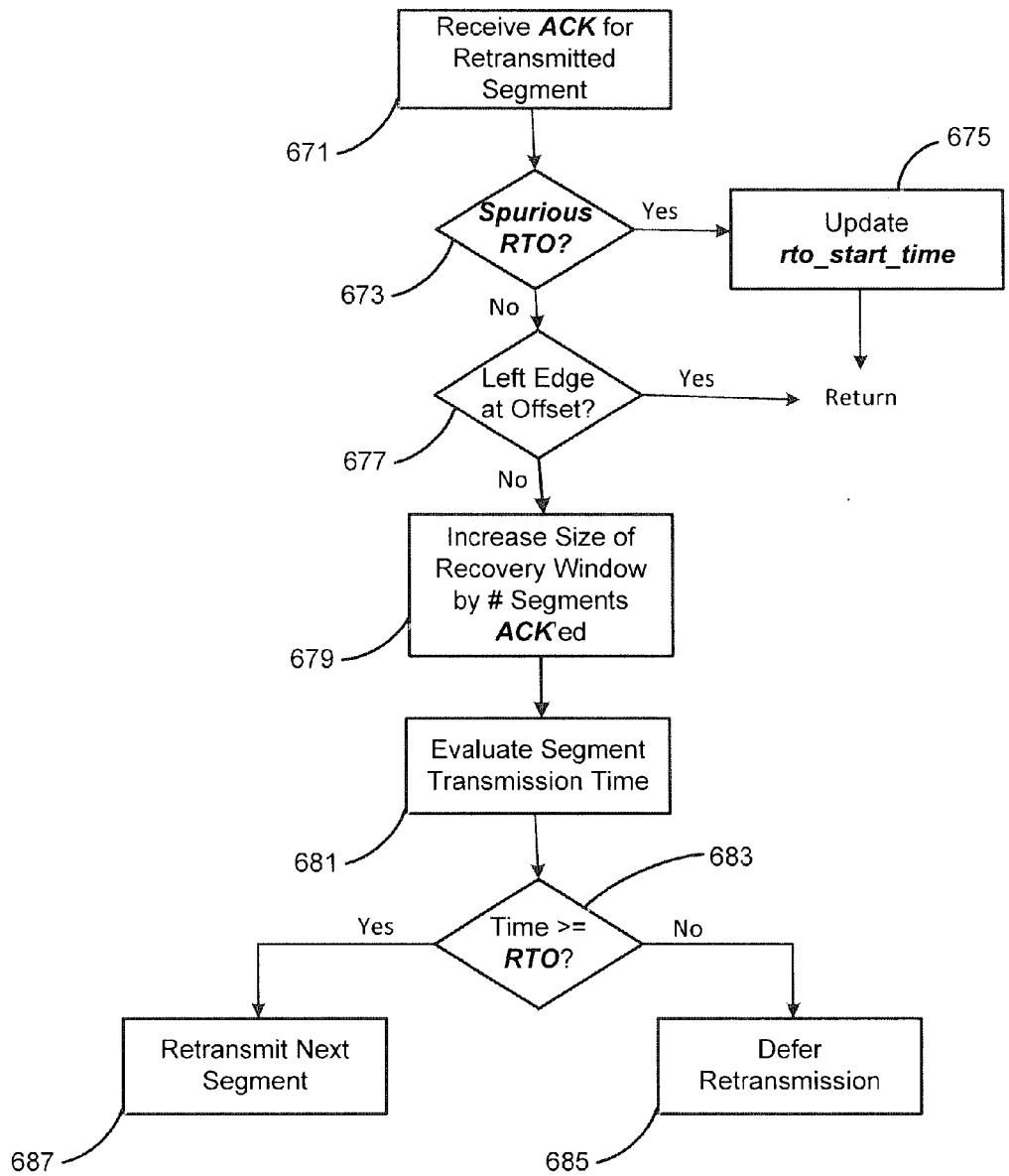
FIG. 14 is a flow diagram showing a process for a retransmission method.

In FIG. 12, if all active sessions are in the session recovery state (step 629), then a host RTO is said to have occurred (step 631), and a recovery window is set in step 650 (see FIG. 14). The occurrence of the host RTO results in a congestion bubble "burst" (step 633) (this is analogous to TCP's congestion window collapse), followed by slow-start (step 637), and an exponential back-off of the RTO timer value (step 639). However, if fewer than all of the active sessions have entered the session recovery state (step 641), or if one or more sessions have performed a fast retransmit, the congestion bubble does not collapse to 1 MSS, but the recovery window is still set in step 650. The size of the congestion bubble is reduced by some multiplicative factor (step 643) (e.g. 50%), the sender enters fast recovery (step 645), and the RTO value is left unchanged.

It is important to note here that if there is only one active session, then the distinction between a session RTO and a host RTO disappears, and the retransmission behavior naturally aligns itself with conventional TCP congestion avoidance. However, in the multi-session scenario, congestion on a single session has implications for all the other sessions destined for the same host, which invariably leads to faster recovery and reduces the overall congestion experienced due to a greedy host with many sessions.

4.2 Session Recovery

Figure 13:
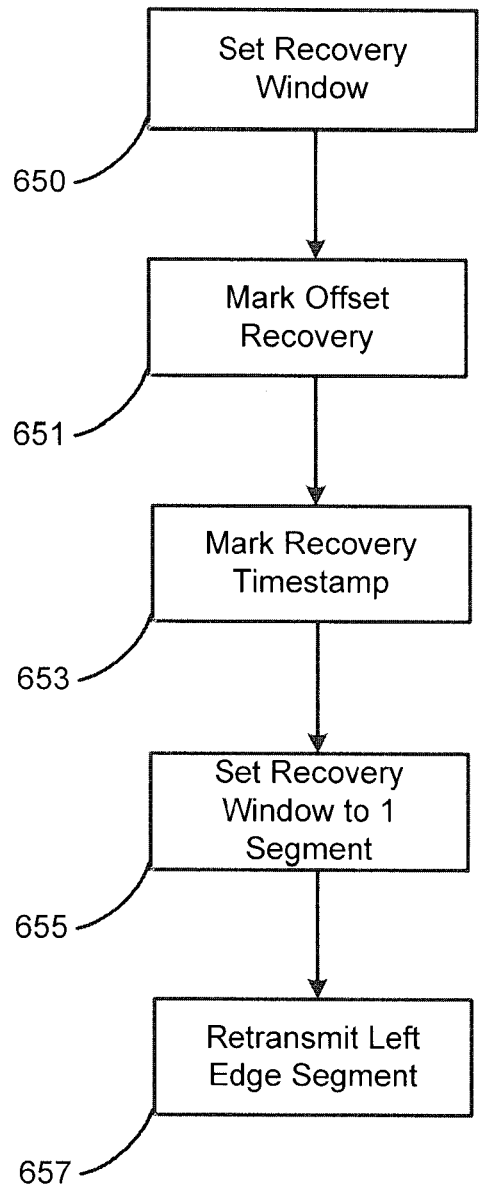
FIG. 13 is a flow diagram showing a process for a segment recovery method.

A session must enter the recovery state if and only if its retransmission timer has expired (i.e. not when performing a fast retransmit). In FIG. 13, upon transitioning to the recovery state (step 650), the session must mark its highest transmitted offset as the recovery offset (step 651), and it should mark the current timestamp as the recovery timestamp (step 653). If DMP is employed as the underlying transport layer, or if the TCP timestamps option is enabled, then the recovery timestamp can be used to detect a spurious session RTO, as defined in the article by Ludwig et al. entitled "The Eifel Detection Algorithm" (RFC 3522, Internet Engineering Task Force, 2003). Any time a session encounters an RTO, its recovery window must be initialized to 1 segment (step 655), and it must retransmit the segment at the left edge of its retransmission buffer (step 657) after informing the algorithm that a segment has been deemed to be lost (see above). The recovery window is analogous to the TCP congestion window, but is only active during the session recovery phase. Once the recovery phase is complete, then the session is once again free to consume as much or as little of the congestion bubble as the transmit scheduler will allow.

The implication of the recovery window is that it ensures that an ASM-aware congestion control method is never more aggressive than multiple independent TCP flows. Again, if there is only one active session, the congestion bubble will have also been set to 1 MSS (due to a host RTO), so there will be no difference in behavior. However, if there are multiple sessions, the congestion bubble will have been reduced, but will generally be larger than 1 segment. In such a situation, the recovering session will not be allowed to fill the congestion bubble beyond the size of its own recovery window. Other sessions will still be allowed to progress (albeit within the reduced bubble size), provided that they have not encountered any congestion events of their own.

In FIG. 14, once an acknowledgement arrives for the retransmitted segment, one of the following actions must be taken:

(i) If the retransmission was deemed to be spurious (step 673), then the session must immediately exit the recovery state and update rto_start_time (step 675). A spurious RTO response technique, such as the one defined in the article by Ludwig et al. entitled "The Eifel Response Algorithm for TCP" (RFC 4015, Internet Engineering Task Force, 2005), may also be invoked to modulate the size of the congestion bubble.

(ii) If the left edge of the session has reached the recovery offset (step 677), then the session recovery phase is complete. Once again, the session exits the recovery state and can resume normal transmission.

(iii) In all other cases, the recovery window must be increased by the number of segments that were covered by the acknowledgement (i.e. growth according to the slow-start algorithm) (step 679). It is highly recommended to place a conservative upper limit on the size of the recovery window (e.g. 16 segments), in order to limit the instantaneous burst of segments retransmitted during the session recovery phase.

If the session RTO was not spurious, and there are subsequent segments to retransmit within the recovery offset, then the transmission time of each segment must be evaluated before allowing it to be retransmitted (step 681). If the time elapsed since the last transmission of the next eligible segment in the recovery window is less than the current value of RTO (step 683), its retransmission must be deferred (step 685), otherwise the time elapsed in greater than or equal to RTO and the next segment is retransmitted (step 687). This conservative behavior further helps to reduce spurious retransmissions in the face of sudden increases in path latency.

4.3 Congestion Bubble Size Reduction

Figure 15:
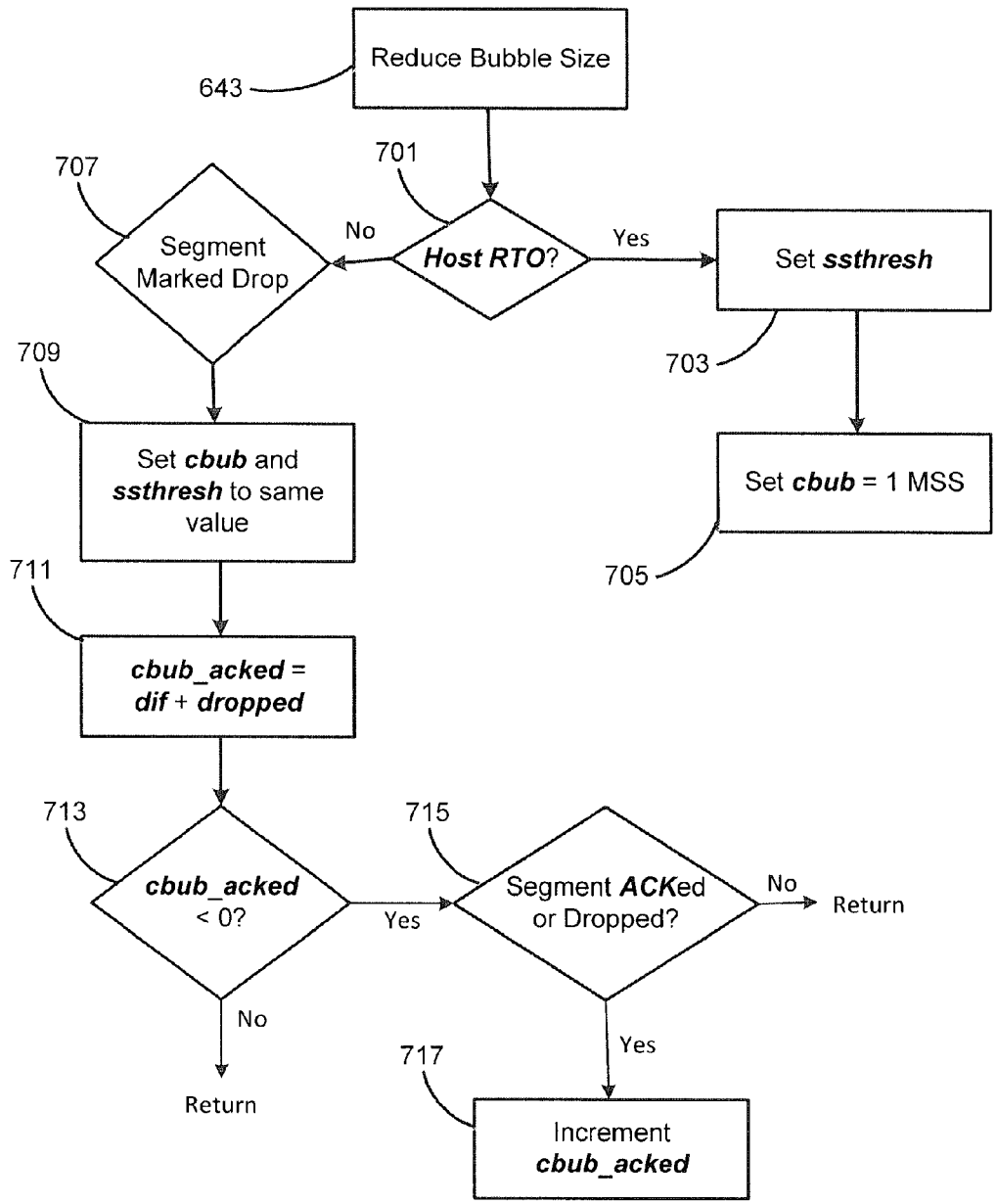
FIG. 15 is a flow diagram showing a process for a sizing the congestion bubble.

There are two means by which the congestion bubble size can be reduced, shown in FIG. 15. The first type of bubble reduction occurs if a host RTO is encountered (step 701), in which case ssthresh is set to some multiplicative factor below the current flight-size (step 703), and chub is set to 1 MSS (step 705). This is known as a congestion bubble burst. In general, dif will exceed cbub under such circumstances, which would normally prevent the transmit scheduler from sending any data. Consequently, in order to allow missing segments to be retransmitted, refer to the algorithm defined in section 4.4 below.

The second type of bubble reduction occurs if a segment has been marked as dropped (step 707), either due to a fast retransmit or to a session (i.e. partial) RTO. In this case, both cbub and ssthresh are immediately set to the same multiplicatively-reduced value (step 709).

Irrespective of the type of bubble reduction, the sender must set the cbub_acked variable to a negative value whose magnitude is the sum of dif and dropped (step 711). Whenever cbub_acked is negative (step 713), the sender is in the loss recovery state. In this state, cbub_acked must be incremented (step 717) any time a segment is acknowledged or deemed to be dropped (step 715). Until the value of cbub_acked once again becomes non-negative, ssthresh must not be further reduced, and cbub can only be reduced (back to 1 MSS) if another host RTO occurs (this prevents multiple reductions resulting from the same congestion event). The period during which cbub_acked is negative is known as the recovery epoch. Again, this logic allows the sender to approximate when one congestion event has passed, and whether or not a subsequent reduction is necessary.

4.4 Transmit Scheduler Advice

The transmit scheduler requires two inputs from the ASM-aware congestion control module: the amount of data to send, and the bandwidth at which to send it. These two values are derived according to the flow chart of FIG. 16.

Figure 16:
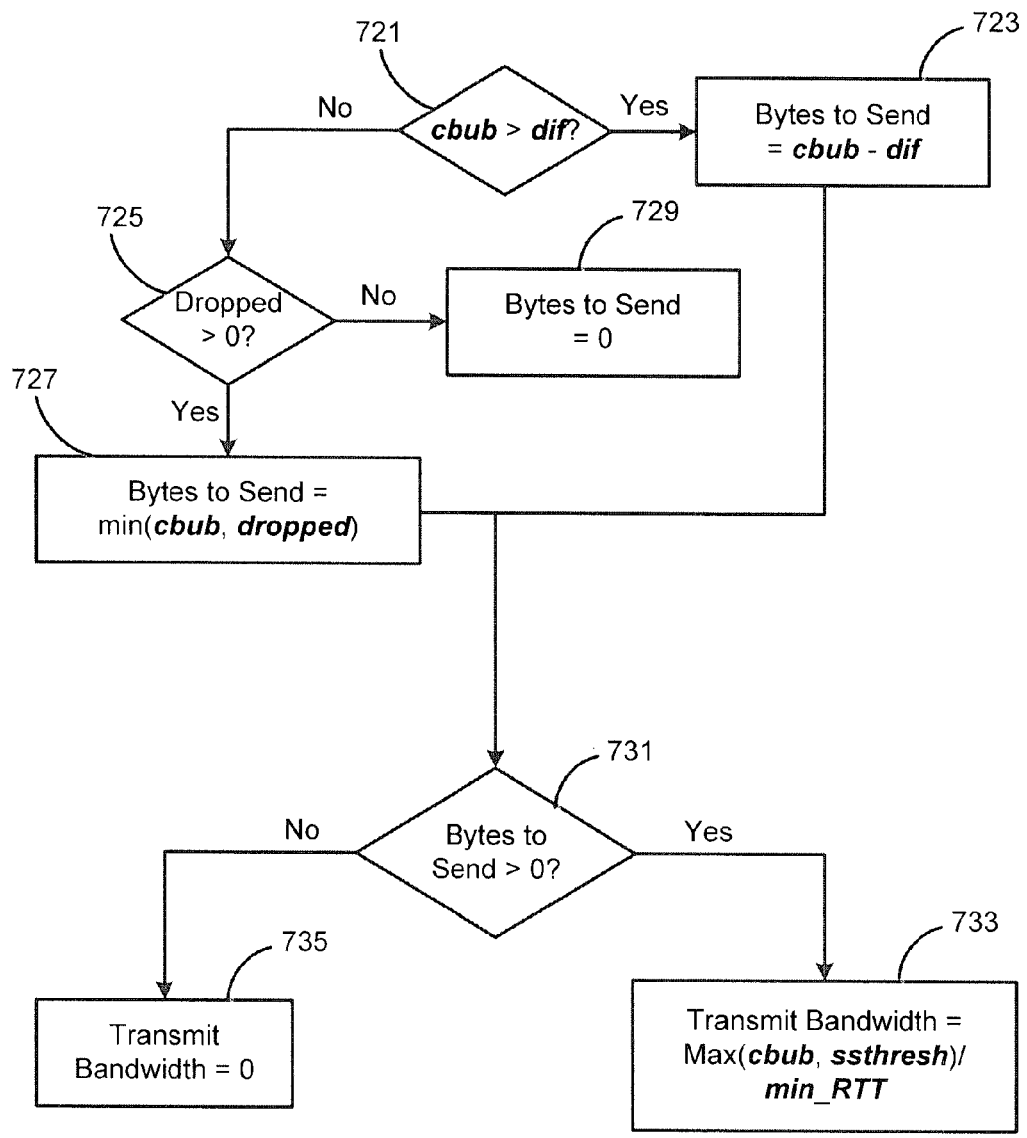
FIG. 16 is a flow diagram showing a process for the retransmit scheduler.

The top portion of FIG. 16 is used to determine bytes_to_send. If cbub is greater than dif in step 721, then bytes_to_send is set equal to cbub—dif in step 723. However, if cbub is not greater than dif in step 721, then if dropped is less than zero in step 725, bytes_to_send is set equal to min(cbub, dropped) in step 727. If dropped is not less than zero in step 725, then bytes_to_send is set equal to zero in step 729.

The bottom portion of FIG. 16 is used to determine transmit_bandwidth. If bytes_to_send is greater than zero in step 731, then transmit_bandwidth is set equal to max(cbub, ssthresh)/min_rtt in step 733. If not, then in step 735, transmit_bandwidth is set equal to zero, where min_rtt is the lowest observed RTT, and ssthresh is assumed to have been initialized (otherwise cbub is simply used to calculate the transmit bandwidth).

In light of the method shown above, particularly in the case where dropped>0 and dif>=cbub, it is imperative that any pending retransmissions be serviced by the transmit scheduler before new data is transmitted, otherwise the congestion bubble will be incorrectly filled, and the packet preservation principle will be violated.

4.5 Caveats for Application or Receiver-Limited Scenarios

As mentioned earlier, each session can have unequal throughput and independent flow control. In order to temper the congestion bubble growth when the sender is application or receiver-limited (rather than congestion-limited), it is important that the transport layer supply the ASM-aware congestion control module with the total number of octets (across all sessions) received from the application layer that have never been transmitted and will fit within the receiver's advertised windows. This value must be maintained in its unsent state variable, and the condition is_cbub_available is true if and only if unsent+dif+dropped>=cbub. If is_cbub_available is not true, cbub must not grow (whether in slow-start or in congestion avoidance). This is analogous to TCP's is_cwnd_limited condition.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, or execute acts in a different order than set out in the illustrated embodiments.

The present methods, systems and articles also may be implemented as a computer program product that comprises a computer program mechanism embedded in a computer readable storage medium. For instance, the computer program product could contain program modules for installing and operating the applications described above. These program modules may be stored on CD-ROM, DVD, magnetic disk storage product, flash media or any other computer readable data or program storage product. The software modules in the computer program product may also be distributed electronically, via the Internet or otherwise, by transmission of a data signal (in which the software modules are embedded) such as embodied in a carrier wave.

For instance, the foregoing detailed description has set forth various embodiments of the devices and applications via the use of examples. Insofar as such examples contain one or more functions or operations, it will be understood by those skilled in the art that each function or operation within such examples can be implemented, individually and/or collectively, by a wide range of hardware, software, firmware, or virtually any combination thereof. In one embodiment, the present subject matter may be implemented via Application-Specific Integrated Circuits (ASICs). However, those skilled in the art will recognize that the embodiments disclosed herein, in whole or in part, can be equivalently implemented in standard integrated circuits, as one or more computer programs running on one or more computers, as one or more programs running on one or more controllers (e.g., microcontrollers) as one or more programs running on one or more processors (e.g., microprocessors), as firmware, or as virtually any combination thereof, and that designing the circuitry or writing the code for the software and or firmware would be well within the skill of one of ordinary skill in the art in light of this disclosure.

In addition, those skilled in the art will appreciate that the applications taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

These and other changes can be made to the present systems, methods and applications in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

The invention claimed is:

1. A transmission method for multiple TCP sessions with the same host, comprising:
   providing a congestion bubble comprising a two-dimensional buffer volume;
   allocating different TCP sessions with the same host to different portions of the congestion bubble during a transmission event for multiple TCP sessions;
   setting the amount of data to be sent equal to the smallest of the current size of the congestion bubble and the amount of dropped data when a current size of the congestion bubble is less than a current flight-size estimate and the dropped data is greater than zero.

2. The method of claim 1, wherein the area of the congestion bubble is the same as a target flight-size.

3. The method of claim 1, further comprising:
   setting a transmit bandwidth equal to the largest of the current size of the congestion bubble and the slow start threshold divided by the minimum round trip time.

4. The method of claim 1, further comprising:
   setting a transmit bandwidth equal to the largest of the current size of the congestion bubble and the slow start threshold divided by the minimum round trip time.

5. The method of claim 1, further comprising:
   incrementing the current flight-size estimate when the transmission event is an initial transmission of data or an acknowledgement of data received;
   incrementing the current flight-size estimate and decrementing the amount of dropped data when the transmission event is a retransmission of data; and
   decrementing the current flight-size estimate and incrementing the amount of dropped data when the transmission event is dropped data.

6. The method of claim 1, further comprising:
   retransmitting unacknowledged segments if the current size of the congestion bubble is less than a flight-size estimate.

7. The method of claim 6, further comprising:
   entering a session recovery state when the current time minus the start time for the retransmission timeout is greater than a stored value for the retransmission timeout.

8. The method of claim 7, further comprising:
   setting a recovery window, entering a slow start mode, and increasing the retransmission timeout when all sessions have a retransmission timeout; and
   setting a recovery window, reducing the size of the congestion bubble, and entering a fast recovery mode when fewer than all sessions have a retransmission timeout.

9. A non-transitory computer readable storage medium having executable instructions for performing a transmission method for multiple TCP sessions with the same host, comprising:
   providing a congestion bubble comprising a two-dimensional buffer volume;
   allocating different TCP sessions with the same host to different portions of the congestion bubble during a transmission event for multiple TCP sessions;
   setting the amount of data to be sent equal to the smallest of the current size of the congestion bubble and the amount of dropped data when a current size of the congestion bubble is less than a current flight-size estimate and the dropped data is greater than zero.

10. The computer readable storage medium of claim 9, further comprising:
    setting a transmit bandwidth equal to the largest of the current size of the congestion bubble and the slow start threshold divided by the minimum round trip time.

11. The computer readable storage medium of claim 9, further comprising:
    setting a transmit bandwidth equal to the largest of the current size of the congestion bubble and the slow start threshold divided by the minimum round trip time.

12. A system for controlling the transmission of data in multiple TCP sessions with the same host, comprising:
    a server having a transmit scheduler and a congestion control module,
    wherein the transmit scheduler determines how much data a TCP session is allowed to transmit and how much bandwidth to allocate to the TCP session and further sets the amount of data to be sent equal to the smallest of the current size of the congestion bubble and the amount of dropped data when a current size of the congestion bubble is less than a current flight-size estimate and the dropped data is greater than zero, and
    wherein the congestion control module provides a congestion bubble comprising a two-dimensional buffer volume and allocates different TCP sessions with the same host to different portions of the congestion bubble during a transmission event for multiple TCP sessions.

13. The system of claim 12, wherein the transmit scheduler sets a transmit bandwidth equal to the largest of the current size of the congestion bubble and the slow start threshold divided by the minimum round trip time.

* * * * *